UNITED STATES PATENT OFFICE.

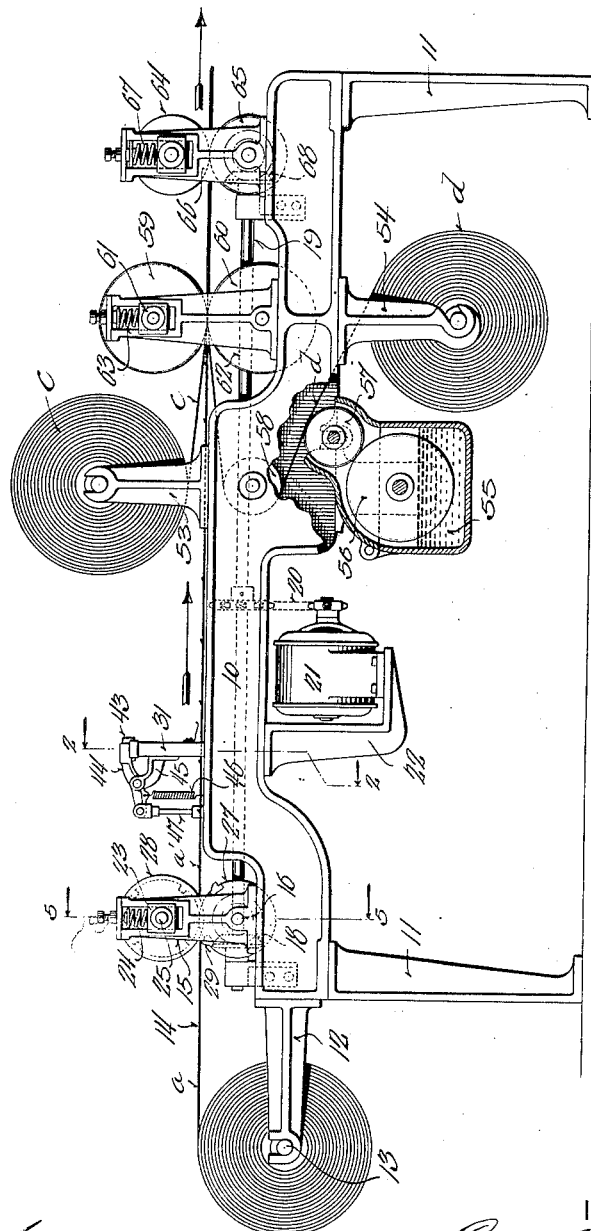

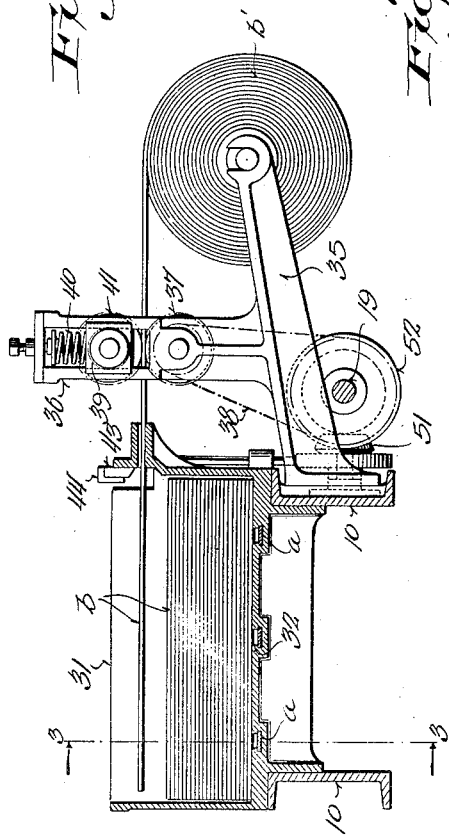

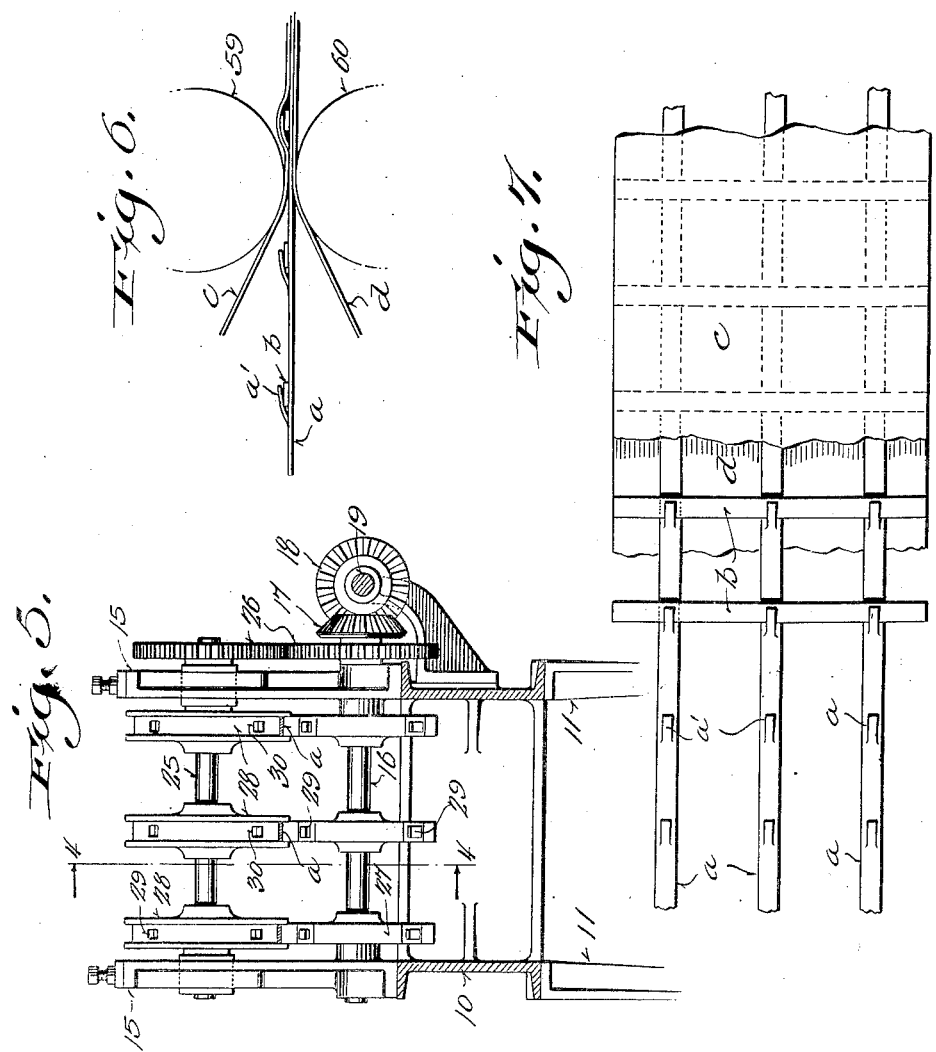

GEORGE J. THUST, OF MILWAUKEE, WISCONSIN.

METHOD AND APPARATUS FOR MAKING REINFORCED BOX-WALLS.

1,358,126.  Specification of Letters Patent.  Patented Nov. 9, 1920.

Application filed August 23, 1919. Serial No. 319,368.

*To all whom it may concern:*

Be it known that I, GEORGE J. THUST, a citizen of the United States, and resident of Milwaukee, in the county of Milwaukee and State of Wisconsin, have invented certain new and useful Improvements in Methods and Apparatus for Making Reinforced Box-Walls; and I do hereby declare that the following is a full, clear, and exact description thereof.

My invention relates to new and useful improvements in reinforced box walls or similar structure of that type including paper or other fabric sheets, between which are secured crossed reinforcing metal strips, and to the method of making such structure, my invention also relating to apparatus for most conveniently and economically carrying out said method.

It is the object of my invention to provide a reinforced structure of this character which is of maximum strength consistent with a desired economy and lightness of material and which lends itself to most economical manufacture.

A further object of my invention is to facilitate the manufacture of such reinforced structure by the provision of an improved method of forming the structure, wherein connecting portions struck from certain of the reinforcing members of the structure serve to assist in assembly of the other reinforcing members of the structure therewith. A further object resides in the provision of a simple apparatus for procuring a most rapid and economical manufacture of the structure in accordance with my improved method.

In the accompanying drawings:

Figure 1 is a side elevational view of a machine adapted to carry out my improved method in a most economical manner.

Fig. 2 is a transverse sectional view through the machine on a plane indicated by the lines 2—2 of Figs. 1 and 3.

Fig. 3 is a transverse sectional view through the transverse reinforcing strip magazine on a plane indicated by the line 3—3 of Fig. 2.

Fig. 4 is a sectional view through the punching mechanism of the longitudinal reinforcing strips, on a plane indicated by the line 4—4 of Fig. 5.

Fig. 5 is a transverse sectional view through the machine on a plane indicated by the line 5—5 of Fig. 1.

Fig. 6 is a detail view of the pressure roller action.

Fig. 7 is a plan view of a portion of my improved reinforced box wall or other structure, with sections progressively broken away.

Referring now more particularly to the accompanying drawings, there is provided a main frame including the side sills 10 and supported on suitable legs 11. Bracket arms 12 project from the forward end of the main frame and mount a shaft 13 which carries a plurality of rolls of reinforcing metallic ribbon 14. For feeding the ribbons *a* into the machine, and at the same time forming upwardly struck tongues *a'* in regularly spaced relation on said ribbons for receiving transverse reinforcing metallic strips *b*, a pair of bearing standards 15 are mounted on the forward portions of the frame sills 10. A shaft 16 is journaled in the lower portion of the standards, said shaft being driven by a bevel gear 17 thereon meshing with a bevel gear 18 on a main drive shaft 19 extending longitudinally of the machine and having a sprocket connection 20 with a motor 21 mounted on a bracket 22 under the intermediate portion of the main frame. The standards 15 also carry sliding boxes 23 resiliently urged downward by the springs 24 and in which are journaled, the end portions of a shaft 25 which is connected with and driven from the shaft 16 by intermeshing gear wheels 26 of equal size on said shafts. A plurality of rollers 27 are mounted on the shaft 16 and these rollers have their peripheral portions engaged in peripheral channels formed in coacting rollers 28 secured on the shaft 25. These pairs of rollers 27 and 28 receiving one of the ribbons 14 therebetween, said ribbon being guided by the channeled flanges of the roller 28. Thus the ribbons are evenly fed into the machine, and tongues *a'* are simultaneously struck upwardly at regularly spaced portions of the ribbons, by punch projections 29 on the peripheries of the rollers 27 which coact with recesses 30 in the peripheries of the rollers 28, said projections and recesses being regularly spaced about the peripheries of the rollers.

These tongues are adapted to receive the transverse reinforcing strips *b*, and serve to procure feeding action of said transverse strips. Thus, a magazine 31 for the transverse strips *b*, is mounted transversely over the forward portion of the main frame and the bottom of the magazine is provided with slots 32 therethrough receiving the ribbons $a$ and their tongue portions $a'$, said slots extending through the side walls of the magazine and having their sides under cut to receive the edge portions of the ribbons, the top of the tongues being guided into said slots by a beveled finger 33 projecting forwardly from the front wall of the magazine. The rear wall of the magazine is spaced from the bottom thereof a distance equal to the thickness of one of the strips $b$. Hence, as shown in Fig. 3, as the ribbons move through the magazine, each horizontally alined series of tongues $a'$ will engage one of the strips $b$ and force it from the magazine. Downwardly inclined detent fingers 34 extend rearwardly from the magazine and are adapted to engage the strips $b$ as they move rearwardly upon the ribbons, yieldably holding said strips so that the tongue may move thereover, thus procuring a snug fit of the strips within the confines of the tongues. The strips are supplied to the magazine from a roll $b'$ carried by bracket arms 35 projecting laterally from one of the side frame sills 10 adjacent the magazine. These brackets also carry standards 36 in which are journaled a feed roller 37 driven by a sprocket connection 38 with the main drive shaft 19. The standards also carry sliding blocks 39 urged downwardly by springs 40 and mounting a roller 41. The ribbon is fed between the rollers 37 and 41 and is extended into the magazine through a throat carried by the adjacent end wall thereof. The ribbon is cut into the strips $b$, which are stacked in the magazine by a knife blade 43 movable over the inner end face of the throat and carried by a lever 44 which is intermediately pivoted on a bracket arm 45 carried by the magazine. The knife blade is normally urged to raised position by a spring 46 secured to the remote end portion of the lever, and the knife is intermittently operated by a rod 47 pivoted to the remote end portion of the lever and slidable in a guide 48 on the magazine, and engageable by a cam 49 mounted on a stub shaft 50 carried by one side of the main frame and driven from the main shaft by a bevel gear wheel 51 thereon meshing with a beveled gear 52 on the main shaft.

The longitudinal ribbons $a$ and transverse strips $b$, are connected together by the tongues $a'$ and for applying body sheeting to both sides of this reinforcement, a roll of paper or other fibrous material $c$ is mounted between standards 53 carried by the side sills rearwardly of the magazine, and a second roll of body sheeting $d$ is mounted in hangers 54 depending from the sills. A glue receptacle 55 is mounted under the main frame forwardly of the roll $d$ and a roller 56 is disposed therein which engages a floating feed roller 57 that is in turn engaged by material trained forwardly thereover from the roll $d$, said material being then trained about an idle roller 58 mounted in the frame and extended rearwardly, being thus provided with a coating of paste whereby the reinforcement and both rolls of body sheeting may be pasted together. The webs $c$ and $d$ and said reinforcement pass between upper and lower pressure rollers 59 and 60 carried by standards 62 on the side sills rearwardly of the roller 58 and roll $c$, the upper roller 59 being mounted in sliding blocks 61 resiliently urged downwardly by springs 63. A pair of upper and lower feed rolls 64 and 65 are carried by standards 66, the upper roll being urged toward the lower roll by springs 67, the lower roll being driven by a bevel gear connection 68 with the main shaft 19.

An exceedingly simple method of forming reinforced box walls has thus been provided, which may be carried out in a convenient manner embodying the machine described. Attention is particularly directed to the utilization of ribbon carried securing portions for the transverse strips to procure the feeding and proper spacing of said transverse strips onto the ribbons.

The completed reinforced structure is shown in Fig. 7, and it is noted that by reason of the paste engagement between all of the parts, which is procured by the coating of paste supplied to the lower sheeting $d$, the transverse strips $b$ are positively held within the confines of the ribbon or longitudinal strip tongues $a'$. The tongues $a'$ obviously serve to hold the strips $b$ against relative movement under various strains to which the structure would be subjected in use.

What is claimed is:

1. The method of forming reinforced structure of the class described which consists in simultaneously feeding a plurality of ribbons of reinforcing material to a punching mechanism, in punching projections from said ribbons, in applying transverse reinforcing strips to said ribbons, in utilizing the tongues for spacing said transverse strips apart on the ribbons, and in finally applying body sheeting to the reinforcing skeleton structure thus provided.

2. A machine for forming reinforced structure comprising a main frame, means for supporting a plurality of rolls of reinforcing ribbons on the frame, pairs of superposed rollers on the frame having coacting punch projections and recesses in their peripheries and receiving the ribbon therebetween, means for feeding transverse strips to the ribbons to be engaged with projections thereof punched by said rollers, and means disposed rearwardly of said feeding means for applying body sheeting to the ribbons and strips.

3. A machine for forming reinforced structure comprising a main frame, means for supporting a plurality of rolls of reinforcing ribbons on the frame, means for feeding said ribbons, means for punching series of projections from said ribbons, a magazine disposed transversely on the frame rearwardly of said punching means with respect to direction of travel of the ribbons and provided with slots receiving the ribbons and projections punched therefrom, said magazine being open at its rear portion whereby movement of ribbons therethrough will feed transverse strips from the magazine, and means disposed rearwardly of the magazine for applying body sheeting to the ribbons and strips.

4. A machine for forming reinforced structure comprising a main frame, means for supporting a plurality of rolls of reinforcing ribbons on the frame, means for feeding said ribbons, means for punching series of upwardly struck tongues from the ribbons, a magazine disposed transversely on the frame rearwardly of the punching means with respect to direction of travel of the ribbons, and provided with slots receiving the ribbons and tongues punched therefrom, said magazine being open at its rear portion whereby movement of ribbons therethrough will feed transverse strips from the magazine, means disposed rearwardly of the magazine for forcing the transverse strips between the tongues and bodies of the ribbons, and means disposed rearwardly of the magazine for applying body sheeting to the ribbons and strips.

5. A machine for forming reinforced structure comprising a main frame, means for supporting a plurality of rolls of reinforcing ribbons on the frame, means for feeding said ribbons, means for punching series of upwardly struck tongues from the ribbons, a magazine disposed transversely on the frame rearwardly of the punching means with respect to direction of travel of the ribbons, and provided with slots receiving the ribbons and tongues punched therefrom, said magazine being open at its rear portion whereby movement of ribbons therethrough will feed transverse strips from the magazine, springs disposed rearwardly of the magazine and yieldably engageable by the transverse strips for forcing said strips between the tongues and bodies of the ribbons, and means disposed rearwardly of the springs for applying body sheeting to the ribbons and strips.

6. A machine for forming reinforced structure comprising a main frame, means for supporting a plurality of rolls of reinforcing ribbons on the frame, pairs of superposed rollers on the frame having coacting punch projections and recesses in their peripheries and receiving the ribbons therebetween, peripheral flanges on certain of said rollers embracing the peripheral portions of opposed rollers and forming guides for the ribbons, means for feeding transverse strips to the ribbons to be engaged with projections thereof punched by said rollers, and means disposed rearwardly of said feeding means for applying body sheeting to the ribbons and strips.

In testimony that I claim the foregoing I have hereunto set my hand at Menominee, in the county of Menominee and State of Michigan.

GEO. J. THUST.